Figure 5:
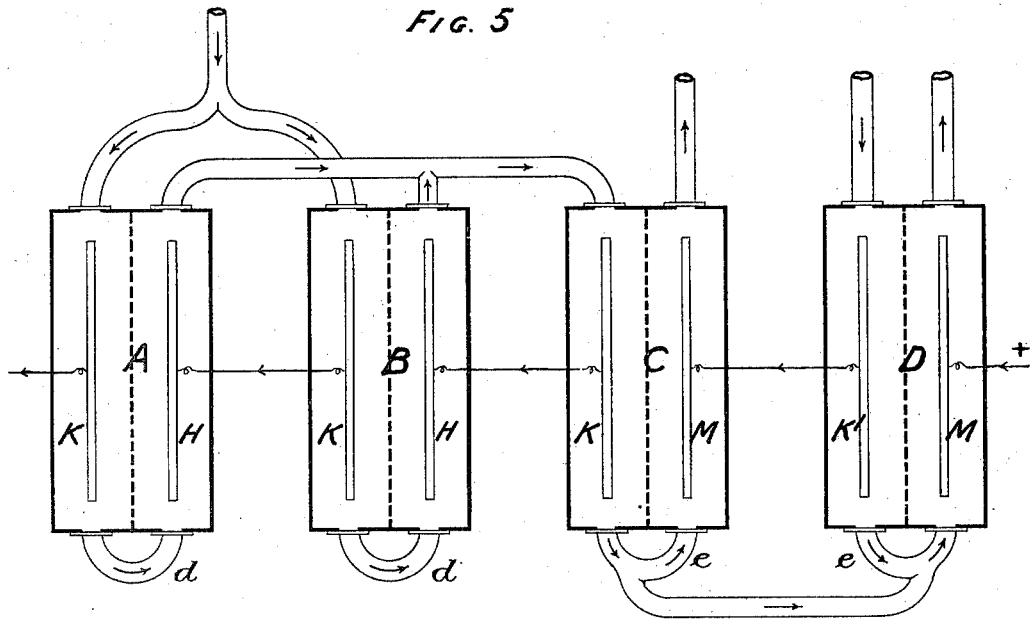

(No Model.)   3 Sheets—Sheet 1.
E. A. ASHCROFT.
TREATMENT OF METALLIFEROUS ORES AND PRODUCTS.
No. 600,351. Patented Mar. 8, 1898.
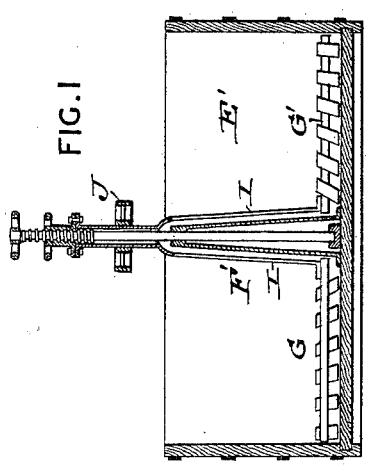
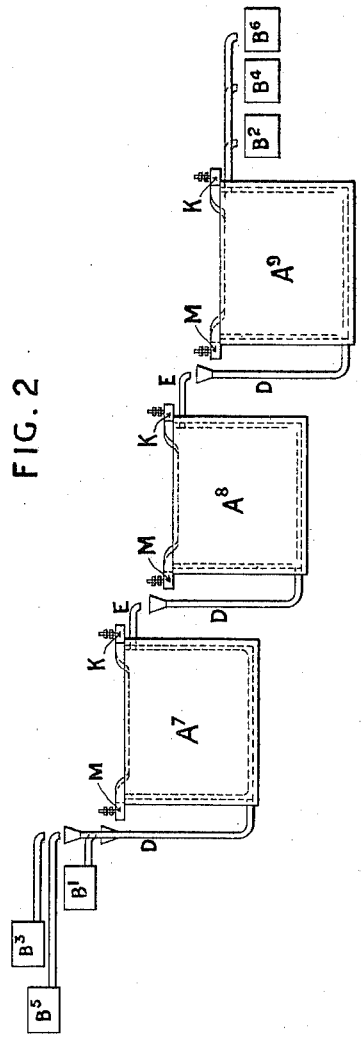

(No Model.) 3 Sheets—Sheet 2.
E. A. ASHCROFT.
TREATMENT OF METALLIFEROUS ORES AND PRODUCTS.
No. 600,351. Patented Mar. 8, 1898.
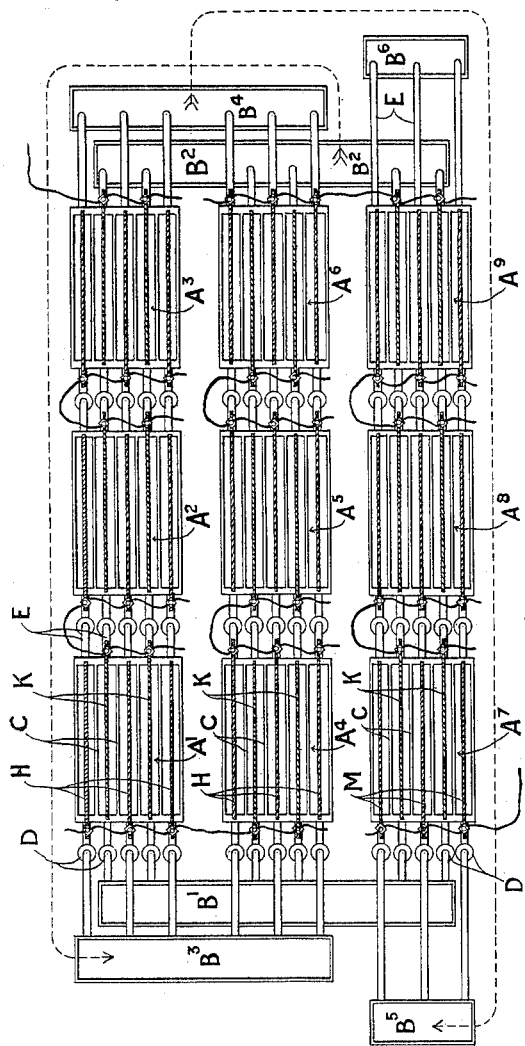
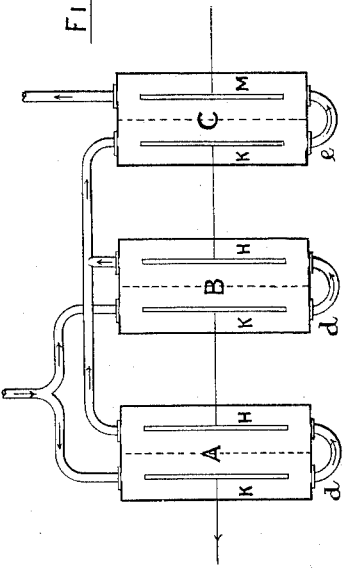

(No Model.) 3 Sheets—Sheet 3.
E. A. ASHCROFT.
TREATMENT OF METALLIFEROUS ORES AND PRODUCTS.
No. 600,351. Patented Mar. 8, 1898.

UNITED STATES PATENT OFFICE.

EDGAR ARTHUR ASHCROFT, OF MELBOURNE, VICTORIA.

TREATMENT OF METALLIFEROUS ORES AND PRODUCTS.

SPECIFICATION forming part of Letters Patent No. 600,351, dated March 8, 1898.

Application filed February 4, 1897. Serial No. 621,987. (No specimens.)

*To all whom it may concern:*

Be it known that I, EDGAR ARTHUR ASHCROFT, electrical engineer, a subject of the Queen of Great Britain, residing at 34 Queen street, Melbourne, Victoria, have invented an Improved Process for the Treatment of Metalliferous Ores and Products, of which the following is a specification.

This invention relates to the treatment of ores and products containing copper and iron in conjunction with the combined leaching and electrolytic treatment of ores and products containing zinc.

My improved process is carried out in a manner and with apparatus very similar to my former process, as described in detail in the specification of previous Letters Patent, dated the 24th day of September, 1895, No. 546,873.

The essential improvements now made consist in working, in conjunction with the zinc-bearing ores and products, other ores and products, especially products containing copper and iron, such as are obtained from iron and copper pyrites or sulfid ores by means of the preliminary furnace treatment almost universally employed in the treatment of such ores. These products—viz., copper and iron mattes, regulus, or crude copper—can by the method under review be employed as a substitute for a portion of the iron anodes required in my process above referred to, and in such employment, while effecting an economy in the treatment of the zinc-bearing ores, are themselves cheaply treated for the recovery of their valuable constituents.

In carrying this improved process into effect I operate in a similar manner and with similar apparatus and with the same solutions as in the former patented process, with the exception that I substitute for the iron anodes (either entirely or partially) anodes consisting of the iron and copper bearing mattes, regulus, or crude metal above mentioned. The metals in this material may occur in various proportions to each other, but it is immaterial for the purpose of this invention what those proportions are except in so far as may be determined by economical considerations. In operating with anodes of this description the gold, silver, and sulfur of the anode are set free in solid form, while iron and copper are imparted to the solution in amounts depending on the composition of the anodes. While the products of the electrolysis of the anodes are being dissolved as in the formerly-patented process, pure zinc is being deposited at the cathode as before. The copper imparted to the solution in the anode-chamber may be subsequently removed therefrom by electrolysis, and ferrous salts contained in the same solution may in such electrolysis be also raised to the ferric state, the electrolysis being performed in vats having insoluble anodes and copper cathodes separated by diaphragms. In such electrolysis the solution, after the copper has been deposited on the copper cathode, is led into the anode-compartment, where the oxidation of the dissolved ferrous salts into ferric salts proceeds. The copper thus produced is refined copper, and the ferric-salt solution is regenerated leaching solution suitable for leaching zinc-bearing ores.

Figure 6:
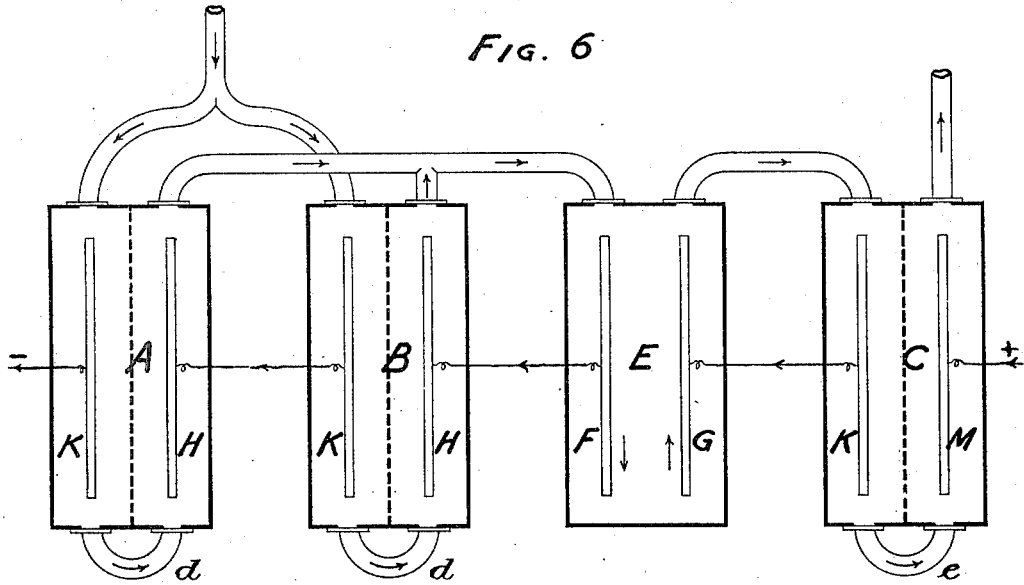

The process, hereinafter described in full with reference to Figures 1, 2, and 3 of the accompanying drawings, will be best understood by the following preliminary description of the electrolytic part of the operation with reference to the diagram Fig. 4. Figs. 5 and 6 are views similar to Fig. 4 of constructions used in certain cases hereinafter mentioned.

The leaching-vat E', Fig. 1, is provided with stirring appliances F''. These may be a number of shoes or prongs G', fastened to a suitable frame I, upon the upper portion of which is a pulley J, which may be driven by a belt from any convenient motive power. The vat is charged from the top and suitable outlets are provided for withdrawing its contents. The solution containing salts of zinc practically pure is led into the vats A and B, Fig. 4 of the drawings, which are duplicated, coming into the cathode-compartments K. The zinc is partially deposited in the cathode-chambers. The solution then passes into the anode-chamber H. The anodes are copper mattes, and consequently copper and ferrous salts become added to the solution. The solution is then led into the cathode-chambers of another vat C, where the copper is taken out as refined metal. Hence the solution containing only zinc and ferrous salts passes to the anode-chamber of the same vat C, where, in contact with carbon anodes M, its iron content becomes oxidized to the ferric state. Three vats are shown diagrammatically in series, so that the quantities of metals are correctly proportioned for cyclic working in connection with the leaching process. If the matte contain more than the best proportion of iron, part of the liquid from the cathode-chamber K of C, when freed from copper, is led into the anode-chamber of a similar subsidiary vat D with carbon anodes, where the ferrous salt is oxidized in the anode-chamber. The cathode-chamber of this subsidiary vat is fed with pure zinc solution, from which zinc is deposited on the zinc cathode K'. Fig. 5 illustrates the use of such subsidiary vat. The solution from the cathode-chamber of this subsidiary vat is then added to the anode solutions in A and B. If, on the other hand, the matte contain too much copper, a subsidiary vat E is interpolated between C and A and B with iron anodes G and copper cathodes F and no diaphragm. Copper is thus deposited and iron goes into solution. Fig. 6 illustrates the use of such interpolated vat. Merely treating the liquid with metallic iron may suffice. The pipes $d$ $d$ $e$ (shown in the diagram) connect the anode and cathode compartments in each vat.

It will be seen that cathodes of other conducting materials than copper may be used, if desired.

In certain cases it may be preferred to take the whole or a part of the copper out of the solution by the simple contact of metallic iron, (known as the "cementation" method,) in which case an equivalent of iron is dissolved for the copper precipitated. In other cases copper may be deposited at the cathode, while metallic-iron anodes become dissolved and the superabundant electromotive force then developed may be usefully employed to aid the operation of depositing zinc by connecting such vats in the same electrical circuit as the vats wherein the zinc is deposited. (See Figs. 5 and 6.) In cases where pure zinc is to be deposited it will be necessary to employ diaphragms; but in certain cases a diaphragm may be dispensed with and the proportion of the different metallic salts in solution may be maintained sufficiently constant to insure a uniform product—viz., an alloy of the different metals of a uniform composition.

It is unnecessary to more minutely describe the methods herein explained, as they will be readily understood by any person properly versed in the art to which they appertain on reference to the former patent referred to; but to facilitate reference I here incorporate certain portions of the previous specification.

The operation of leaching the zinc-bearing ore or product is the same as before—that is to say, the ore, if it contain zinc sulfid, is first subjected to an oxidizing roast, whereby the zinc sulfid is converted as far as possible to neutral or basic zinc sulfate and zinc oxid, any lead sulfid contained also undergoing oxidation more or less completely. In the case of ores or products containing zinc only in the form of oxid such roasting will be unnecessary. The ore or product having been ground to extreme fineness (which may be done either before or after roasting) is then subjected in properly-proportioned quantity to the action of a leaching solution containing ferric salt, as hereinafter specified, the reaction between the finely-ground ore or product and the solution being promoted by maintaining the same in a constant state of agitation by stirring or otherwise, this operation being continued for from half an hour to two hours and the proportional quantity of ore and solution being so calculated that the reaction with all the iron salt in the solution will be complete when so much zinc has been extracted from the ore that the residue left is of good composition for subsequent smelting. For instance, with ores containing thirty per cent. of zinc probably some five per cent. would be allowed to remain in the residue on account of the higher cost of total extraction. The solution after being separated from the residues may contain a small quantity of silver, gold, copper, antimony, arsenic, manganese, alumina, silica, and other foreign matters taken from the ore, also a small quantity of iron in the form of soluble ferric hydrate, which foreign matters I prefer to remove by well-known means before subjecting the solution to electrolysis. The solution having been brought to the condition indicated is now to be treated in the electrodepositing plant, where zinc is recovered and the solution is recharged with ferric salts, so as to render it fit for use again in the above-described operation of leaching.

The electrodepositing apparatus consists, essentially, of a number of depositing-vats provided with anodes of copper and iron and suitable cathodes (preferably zinc plates) and a number of similar vats having anodes of insoluble material, such as carbon, the total depositing capacity of the plates in the iron-anode vats being about twice that of the carbon-anode vats. Diaphragms of porous material are placed between the anode and the cathode plates, so as to divide each vat into a number of separate cells, permitting the passage of the current without allowing the intermingling of the liquids.

The form and arrangement of the depositing-vat is not material; but one arrangement which I have found suitable is shown in the accompanying drawings. Any suitable number of such sets of apparatus may be employed, and the connection and arrangement of the same may be varied to suit particular conditions and requirements. Fig. 1 is a section of a leaching-vat with stirrers. Fig. 2 shows the arrangement of electrodepositing-vats in a cascade and the reservoirs. Fig. 3 is a general plan of the electrolysis plant.

The electrodepositing-vats are arranged in such a manner and with such pipe-and-trough connections between them that a continual circulation of solution in three separate stages of progress is maintained in the system, the liquids being preferably circulated at sufficient speed to insure a brisk and continual motion at every part of the plates.

The depositing apparatus consists of a series of any number of electrolysis-vats $A'$ $A^2$ $A^3$ $A^4$ $A^5$ $A^6$ $A^7$ $A^8$ $A^9$, preferably arranged as shown in Figs. 2 and 3, and a number of reservoirs $B'$ $B^2$ $B^3$ $B^4$ $B^5$ $B^6$. Each of the vats is divided by diaphragms C, of filter-cloth or other suitable material, into a number of compartments, each of which has an inlet-pipe D entering near the bottom and an outlet-pipe E discharging near the top.

Each of the vats $A'$ $A^2$ $A^3$ $A^4$ $A^5$ $A^6$ contains three copper and iron anodes H and two metallic cathodes K, while each of the vats $A^7$ $A^8$ $A^9$ contains three carbon anodes M and two metallic cathodes K. The electrical connections may be made in any suitable manner, all the plates in the same vat being connected in parallel and the plates of successive vats being connected in series.

The reservoir $B'$ has a number of exit-pipes which discharge into the inlets of the cathode-compartments of the three upper vats $A'$, $A^4$, and $A^7$. The outlet-pipes of these compartments discharge into the inlets of the cathode-compartments of the vats $A^2$, $A^5$, and $A^8$. The outlet-pipes of these compartments discharge into the inlets of the cathode-compartments of the vats $A^3$, $A^6$, and $A^9$, and the outlet-pipes of these compartments discharge into the reservoir $B^2$. The reservoir $B^3$ has a number of exit-pipes which discharge into the inlets of the anode-compartments of the vats $A'$ and $A^4$. The outlet-pipes of these compartments discharge into the inlets of the anode-compartments of the next vats $A^2$ and $A^5$. The outlet-pipes of these compartments discharge into the anode-compartments of the vats $A^3$ and $A^6$, and the outlet-pipes of these compartments discharge into the reservoir $B^4$. The reservoir $B^5$ has exit-pipes which discharge into the inlets of the carbon-anode compartments of the vat $A^7$. The outlet-pipes of these compartments discharge into the inlets of the carbon-anode compartments of the vat $A^8$. The outlet-pipes of these compartments discharge into the inlets of the carbon-anode compartments of the vat $A^9$, and the outlet-pipes of these compartments discharge into the reservoir $B^6$.

For the above-described operations one of several solutions of different though analogous compositions may be employed, according to varying circumstances.

No. 1. Zinc chlorid mixed with sodium, potassium, magnesium, or ammonium sulfate.

No. 2. Zinc chlorid mixed with sodium, potassium, magnesium, or ammonium chlorid.

No. 3. Zinc sulfate mixed with sodium, potassium, magnesium, or ammonium sulfate.

The ferric salt required in each of the above solutions in order to effect the solution of the zinc is generated in the electrodepositing plant, as hereinbefore described.

Having now particularly described and ascertained the nature of my said invention and in what manner the same is to be performed, I declare that what I claim is—

1. The improved process consisting in circulating a zinc-bearing solution first around the metallic cathodes of an electrolytic apparatus, then around the anodes of the said electrolytic apparatus, said anodes consisting of the matte of the products resulting from the preliminary furnace treatment of products or ores containing copper and iron, whereby a solution containing copper and iron is obtained electrolytically, substantially as described.

2. The improved process consisting in circulating a zinc-bearing solution first around the metallic cathodes of a system of vats of an electrolytic apparatus, then around the anodes of the same system of vats of the said electrolytic apparatus, said anodes consisting of the matte of the products resulting from the preliminary furnace treatment of products or ores containing copper and iron, whereby a part or the whole of the zinc content is deposited as metallic zinc and the solution becomes charged with copper and iron, next around the metallic cathodes of another system of vats of the said electrolytic apparatus, and finally around the carbon anodes of the same system of vats of the said electrolytic apparatus, whereby the whole or a part of the copper content is deposited and the iron completely or partially raised to the ferric condition, substantially as described.

3. The improved process of preparing a solution suitable for leaching zinc-bearing ores or zinc-bearing products, consisting in electrolyzing a zinc-bearing solution successively in contact with a suitable cathode and an anode resulting from the preliminary furnace treatment of products or ores containing copper and iron, and then depositing the copper from the resulting ferrous solution and simultaneously raising the iron content of such solution to the ferric state by electrolyzing the said resulting ferrous solution successively in contact with suitable cathodes and insoluble anodes, substantially as described.

EDGAR ARTHUR ASHCROFT.

Witnesses:
Wm. M. Riggall,
Geo. M. Young.